(12) United States Patent
Xu et al.

(10) Patent No.: US 7,369,610 B2
(45) Date of Patent: May 6, 2008

(54) ENHANCEMENT LAYER SWITCHING FOR SCALABLE VIDEO CODING

(75) Inventors: Jizheng Xu, Beijing (CN); Feng Wu, Beijing (CN); Shipeng Li, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 10/725,762

(22) Filed: Dec. 1, 2003

(65) Prior Publication Data

US 2005/0117641 A1    Jun. 2, 2005

(51) Int. Cl.
H04N 11/02    (2006.01)

(52) U.S. Cl. .............................. 375/240.08; 375/E7.078

(58) Field of Classification Search ........... 375/240.08, 375/240.12, 240.21
See application file for complete search history.

(56) References Cited

U.S. PATENT DOCUMENTS

| | | | |
|---|---|---|---|
| 6,292,512 B1 * | 9/2001 | Radha et al. ............ | 375/240.1 |
| 6,614,936 B1 | 9/2003 | Wu et al. | |
| 2003/0169813 A1 * | 9/2003 | Van Der Schaar ..... | 375/240.12 |

OTHER PUBLICATIONS

Hsiang-Chun Huang, et al.; A Robust Fine Granulairty Scalability Using Trellis-Based Predictive Leak; IEEE Transactions on Circuits and Systems for Video Technology, vol. 12, No. 6, Jun. 2002.

Feng Wu, et al.; A Framework for Efficient Progressive Fine Granularity Scalable Video Coding; IEEE Transactions on Circuits and Systems for Video Technology, vol. 11, No. 3, Mar. 2001.

Xiaoyna Sun, et al.; Seamless Switching of Scalable Video Bitstreams for Efficient Streaming; Department of Computer Application, Harbin Institute of Technology, Microsoft Research Asia, Beijing, pp. III-385-III-388; 0-7803-7448-7/02; 2002 IEEE.

Xiaoyan Sun, et al.; Flexible and Efficient Switching Techniques Between Scalable Video Bitstreams; Department of Computer Application, Harbin-Institute of Technology, Microsoft Research Asia, Beijing, 4 pages..

Xiaoyan Sun, et al.; Macroblock-Based Progresisve Fine Granularity Scalable (PFGS) Video Coding with Flexible Temporal-SNR Scalabilities; Department of Computer Application, Harbin Institute of Technology, Microsoft Research Asia, Beijing, 4 pages.

Yuwen He, et al.; H.26L-Based Fine Granularity Scalable Video Coding; Computer Science and Technology Department; Tsinghua University, Microsoft Research Asia, Beijing; pp. IV-548-IV551; 0-7803-7448-7/02; 2002 IEEE.

* cited by examiner

Primary Examiner—Gims Philippe
Assistant Examiner—Erick Rekstad
(74) Attorney, Agent, or Firm—Lee & Hayes, PLLC

(57) ABSTRACT

An exemplary system includes a data encoder generating a base layer bitstream encoded at a base bit-rate, and a plurality of enhancement layer bitstreams encoded at different enhancement layer bit-rates, and a bitstream selection module selecting one of the enhancement layer bitstreams every video frame based on available channel bandwidth. A method includes transmitting a first enhancement layer bitstream encoded at a first bit-rate, detecting a transition in network bandwidth through a switching bit-rate, and transmitting a second enhancement layer bitstream encoded at a second bit-rate based on the transition in network bandwidth.

34 Claims, 6 Drawing Sheets

ENHANCEMENT LAYER SWITCHING FOR SCALABLE VIDEO CODING

TECHNICAL FIELD

The described subject matter relates to video data coding. More particularly, the subject matter relates to enhancement layer switching for scalable video coding.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print. Unfortunately, video data requires significantly more memory and bandwidth than other data types commonly delivered over the Internet. As an example, one second of uncompressed video data may consume one or more Megabytes of data. Delivering such large amounts of data over error-prone networks, such as the Internet and wireless networks, presents difficult challenges in terms of efficiency, reliability, and network capacity.

Real-time delivery of video is often referred to as video streaming. To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, and H.263. In such coding standards, video images are sampled and transformed into coefficients that more or less capture the variation in pixels across the image. The coefficients are then quantized and transmitted to a decoder. The decoder is able to decode the image by performing operations that are substantially the inverse of the encoding operations.

One particular type of motion-compensation-based video coding scheme is fine-granularity layered coding. Layered coding is a family of signal representation techniques in which the source information is partitioned into sets called "layers". The layers are organized so that the lowest, or "base layer", contains the minimum information for intelligibility. The base layer is typically encoded to fit in the minimum channel bandwidth. The goal is to deliver and decode at least the base layer to provide minimal quality video. The other layers, called "enhancement layers", contain additional information that incrementally improves the overall quality of the video. With layered coding, lower layers of video data are often used to predict one or more higher layers of video data.

Another layered coding scheme is progressive FGS (PFGS). In PFGS, two reference images are constructed for each frame, one is the reconstruction image of the base layer, and the other is high quality reference image that is reconstructed using the base layer bitstream and a part of the enhancement layer bitstream. PFGS can improve coding efficiency over FGS because the prediction in PFGS is based on higher quality enhancement layers, rather than only the low quality base layer, as in FGS.

With layered coding, the various layers can be sent over the network as separate sub-streams, where the quality level of the video increases as each sub-stream is received and decoded. A decoder that receives the base layer and the enhancement layers can be configured to choose and decode a particular subset of these layers to get a particular quality according to its preference and capability.

Layered coding schemes are scalable, meaning that each layer can be scaled in one or more aspects to achieve various desired performance goals. Spatial scalability refers to approaches in which an image is decomposed into layers at different spatial resolutions. Signal-to-noise (SNR) ratio scalability refers to approaches in which the same spatial resolution is applied to the layers, but coefficients are quantized at increasingly higher granularities.

While scalability can improve the visual quality of video, serious problems, such as drifting, can occur. Drifting refers to a situation in which reference images at the encoder and decoder do not match. In addition, coding efficiency can be reduced when network bandwidth fluctuations are large. For example, when a scalable video codec is set to optimize coding performance at a low bit-rate, often the performance at high bit-rate will be sacrificed.

SUMMARY

Implementations of systems, methods, data structures, and computer program products described herein solve the above, and other, problems and drawbacks by providing a video encoding scheme that encodes video data frames into multiple layers, including a base layer and at least two enhancement layers of increasingly higher bit-rates, wherein only one of the enhancement layers is transmitted based on a current network bandwidth and a switching bit-rate related to the enhancement layer bit-rates.

An implementation of a system includes a data encoder generating a base layer bitstream encoded at a base bit-rate, and a plurality of enhancement layer bitstreams encoded at different enhancement layer bit-rates, and a bitstream selection module selecting one of the enhancement layer bitstreams every video frame based on available channel bandwidth.

An implementation of a method includes transmitting a first enhancement layer bitstream encoded at a first bit-rate, detecting a transition in network bandwidth through a switching bit-rate, and transmitting a second enhancement layer bitstream encoded at a second bit-rate based on the transition in network bandwidth.

An implementation of a computer program product provides a computer program storage medium readable by a computer system and encoding a computer program that dynamically switches among multiple enhancement layer bitstreams. The implementation of the computer program product encodes a computer program for executing on a computer system a computer process for dynamically switching among multiple enhancement layer bitstreams. A base layer and multiple enhancement layers are generated continually and a switching module selects among the enhancement layers based on the bit-rates of the enhancement layers and a current network bandwidth. The current network bandwidth is analyzed with respect to one or more switching bit-rates associated with the enhancement layer bit-rates to determine which enhancement layer to transmit.

DETAILED DESCRIPTION

This disclosure describes a layered video coding scheme used in motion-compensation-based video coding systems and methods. The coding scheme is described in the context of delivering video data over a network, such as the Internet or a wireless network. However, the layered video coding scheme has general applicability to a wide variety of environments.

Bandwidth fluctuation can be a major problem encountered in transmitting scalable video over the Internet or wireless channels. The video coding scheme described below can adapt to the channel conditions, while providing high coding efficiency and performance.

Exemplary System Architecture

Figure 1:
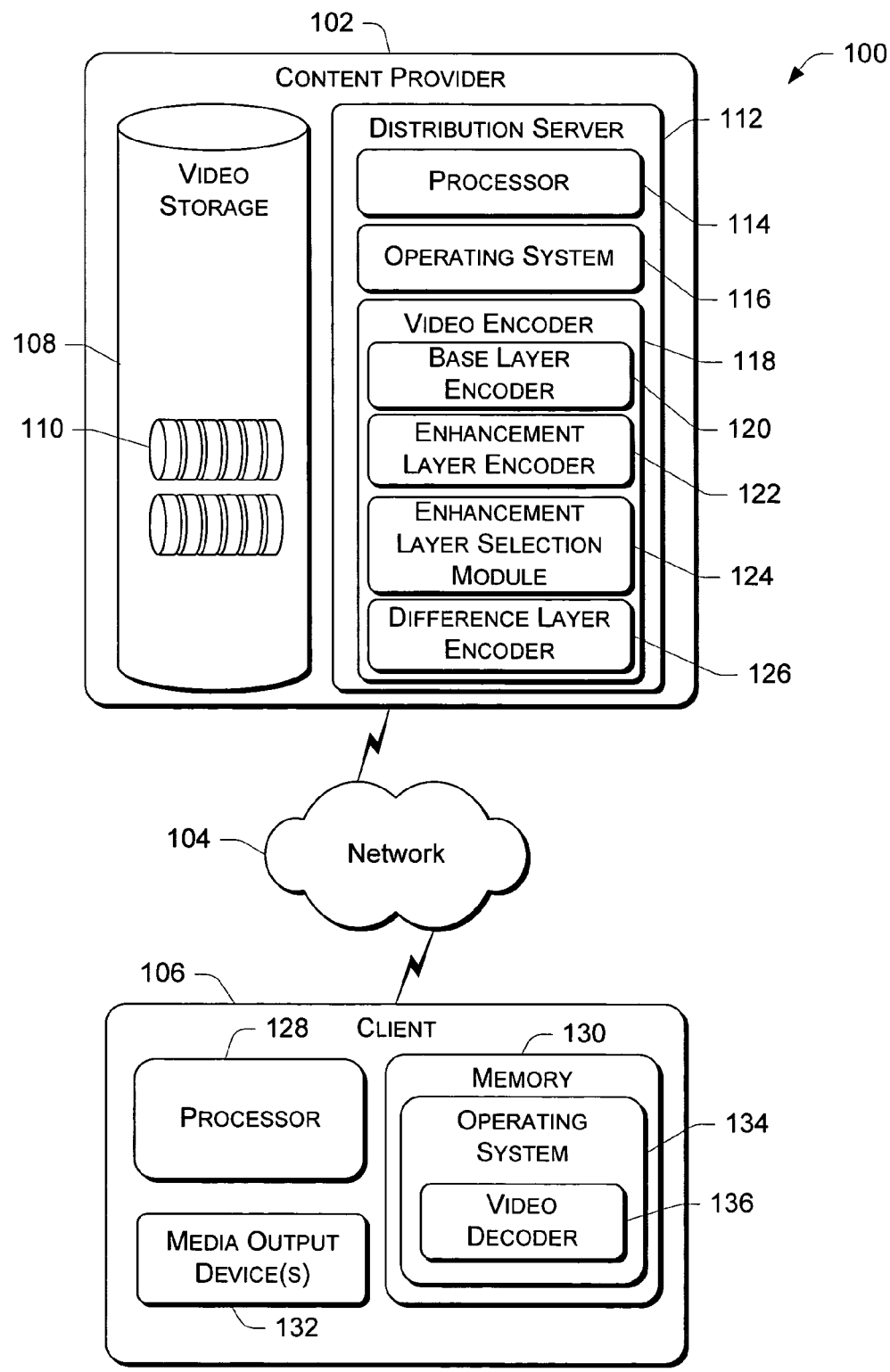
FIG. 1 is a block diagram of a video distribution system in which a content producer/provider encodes video data and transfers the encoded video data over a network to a client.

FIG. 1 shows a video distribution system 100 in which a content producer/provider 102 produces and/or distributes video over a network 104 to a client 106. The network 104 may represent of many different types of networks, including the Internet, a LAN (local area network), a WAN (wide area network), a SAN (storage area network), and wireless networks (e.g., satellite, cellular, RF, etc.).

The content producer/provider 102 may be implemented in many ways, including as one or more server computers configured to store, process, and distribute video data. The content producer/provider 102 has a video storage 108 to store digital video files 110 and a distribution server 112 to encode the video data and distribute it over the network 64. The server 112 has a processor 114, an operating system 116 (e.g., Windows NT, Unix, etc.), and a video encoder 118. The video encoder 118 may be implemented in software, firmware, and/or hardware. The encoder is shown as a separate standalone module for discussion purposes, but may be constructed as part of the processor 114 or incorporated into operating system 116 or other applications (not shown).

The video encoder 118 encodes the video data 110 using a motion-compensation-based coding scheme. One implementation of the video encoder 118 employs a progressive fine-granularity scalable (PFGS) layered coding scheme. The video encoder 118 encodes the video into multiple layers, including a base layer and one or more enhancement layers. The base layer represents an encoded version of the video data 110 that contains the minimum amount of data needed for decoding the video signal. Enhancement layers represent additional information used to enhance the video signal representation when decoded at the client 106. "Fine-granularity" coding means that the difference between any two layers, even if small, can be used by a video decoder to improve the image quality. Progressive Fine-granularity layered video coding ensures that the prediction of a next video frame from a high quality reference of the current video frame is good enough to keep the efficiency of the overall video coding.

In the illustrated implementation, the video encoder 118 includes a base layer encoding component 120 to encode the video data 110 into the base layer, an enhancement layer encoding component 122 to encode the video data into one or more enhancement layers, an enhancement layer selection module 124 to select one of the enhancement layers for transmission based on bandwidth of the network 104, and a difference layer encoding component 126. The video encoder 118 encodes the video data 110 such that each enhancement layer in a current frame is independently based on the base layer. Exemplary implementations of the video encoder 118 are described below in more detail with reference to FIG. 2 and FIG. 4.

Generally, the video data 110 is encoded on a frame-by-frame basis. In one implementation, the base layer and the enhancement layers are concurrently generated as video frames are input. Between two adjacent video frames, the enhancement layer selection module 124 may switch from one enhancement layer to another enhancement layer in response to changes in available network bandwidth in order to improve data transmission performance. The enhancement layer selection module 124 receives feedback from the network 104 regarding the available network bandwidth. Many bandwidth detection techniques are known in the art that may be employed by the enhancement layer selection module 124. By way of example, a common way to measure bandwidth is to directly measure the fastest rate that traffic can be sent through a network.

Based on the detected network bandwidth, the enhancement layer selection module 124 chooses the enhancement layer that has a bit rate that is best fit for the bandwidth. The term 'best fit' herein refers to the degree to which the selected enhancement layer bit-rate matches a switching bit-rate determined by the enhancement layer selection module 124. In one implementation, one or more switching bit-rates are determined from a rate-distortion based function described below with reference to FIG. 3. By selecting an enhancement layer that is best fit for the current network bandwidth, various data transmission performance metrics can be optimized, such as peak signal to noise ratio (PSNR).

In addition to dynamic switching among multiple enhancement layers, a difference layer may be generated by a difference layer encoding component 126. The difference layer encoding component 126 generates a frame-based difference bitstream for determining the enhancement layer of a current frame with reference to a different enhancement layer of a previous frame. The frame-based difference bitstream represents the difference between the current enhancement layer and the most recent enhancement layer switched from for reducing distortion between the content provider/producer 102 and the client 106. An exemplary implementation of the video encoder 118 that provides a frame-based difference bitstream is described below in more detail with reference to FIG. 4.

The client 106 is equipped with a processor 128, a memory 130, and one or more media output devices 132.

The memory 130 stores an operating system 134 (e.g., a WINDOWS-brand operating system) that executes on the processor 128. The operating system 134 implements a client-side video decoder 136 to decode the layered video streams into the original video. In the event data is lost, the decoder 136 is capable of reconstructing the missing portions of the video from frames that are successfully transferred. Following decoding of each video frame, the client 106 plays the video frame via the media output devices 132. The client 106 may be embodied in many different ways, including a computer, a handheld entertainment device, a set-top box, a television, and so forth.

Exemplary PFGS Layered Coding Scheme

Figure 2:
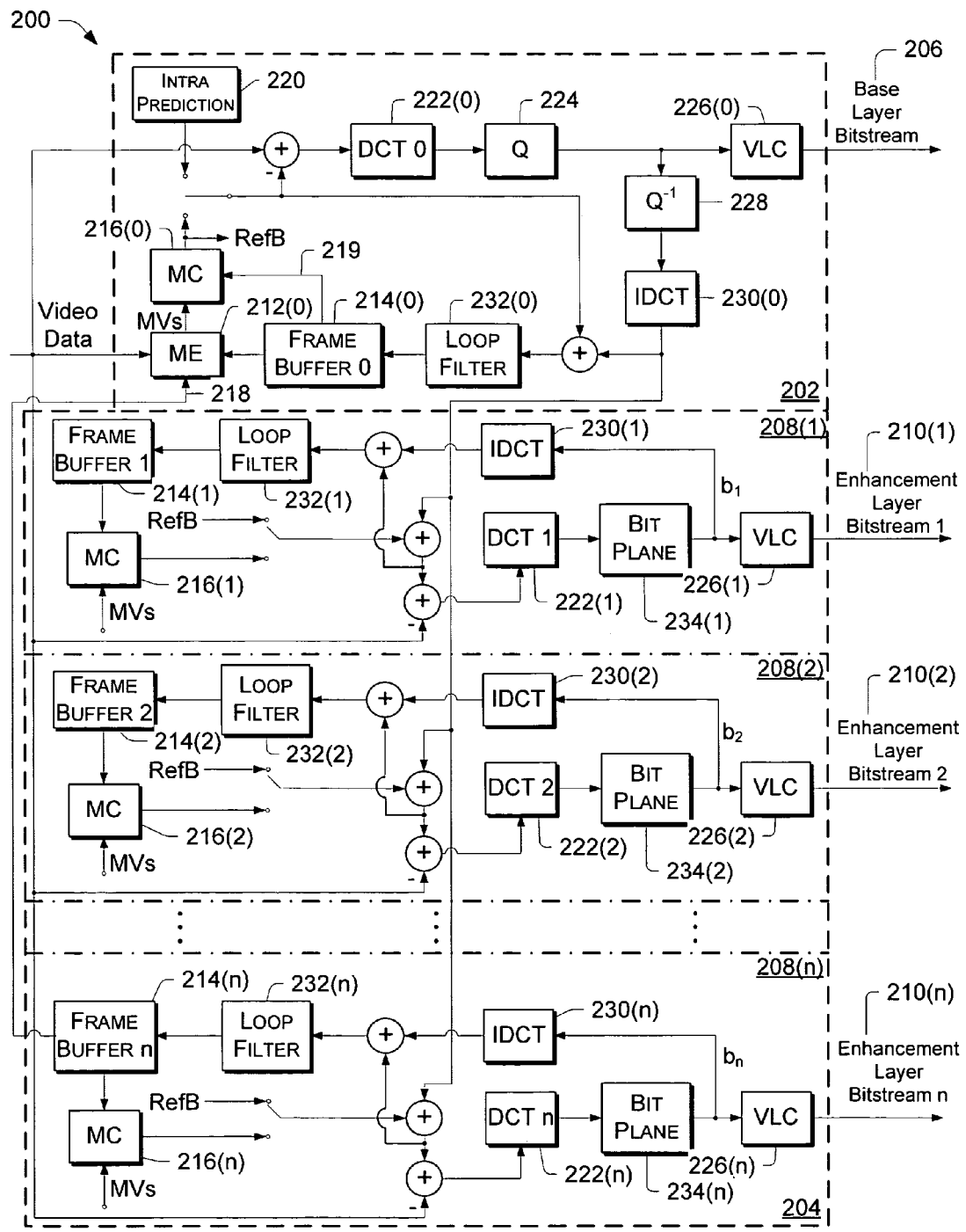
FIG. 2 is a block diagram of an exemplary video encoder without a difference bitstream generator implemented at the content producer/provider.

As noted above, the video encoder 118 encodes the video data into multiple layers, such that a selected enhancement layer and a base layer in a current frame are used to construct a high quality reference image for the frame. A parameter, high quality reference bit-rate (HQRB) associated with each enhancement layer, refers to the number of bits of the enhancement layer that are used to reconstruct the high quality reference image. HQRB is discussed in more detail below. There are many ways to implement a Progressive Fine-Granularity Scalable (PFGS) layered video encoder to facilitate enhancement layer switching. One example is illustrated in FIG. 2 for discussion purposes and to point out the advantages of the scheme. Another example is illustrated below with a difference bitstream in FIG. 4.

FIG. 2 shows an exemplary implementation of a video encoder 200, which may be used by a server to encode video data files prior to distribution over a network. The video encoder 200 shown in FIG. 2 is based on the H.26L standard because of the standard's high coding performance. The video encoder 200 is configured to code video data using layered coding to facilitate an enhancement layer switching scheme, such as the scheme illustrated in FIG. 3 below.

Video encoder 200 has a base layer encoder 202 and an enhancement layer encoder 204, which are delineated by bold dashed boxes. The base layer encoder 202 produces a base layer bitstream 206 associated with a frame of video data. The enhancement layer encoder 204 includes two or more enhancement layer stages 208(1), 208(2), and so on, up to 208(n), which are separated by dashed-dotted lines. The enhancement layer stages 208(1), 208(2), up to 208(n), produce an enhancement layer bitstreams associated with each enhancement layer for each video frame.

Each of the stages 208(1), 208(2), up to 208(n) employs a feedback loop to track a high quality reference image and generate enhancement layer bitstreams 210(1), 210(2), up to 210(n), respectively, wherein 'n' is equal or greater than 2. As shown in FIG. 2, the enhancement layer bitstreams 210(1), 210(2), up to 210(n) may be generated simultaneously. The enhancement layer loops are independent from each other. As such, an ith enhancement layer stage 208(i), $1 \leq i \leq n$, reconstructs a high quality reference image using the base layer bitstream 206 and $b_i$ bits of the enhancement layer bitstream 210(i) generated by the enhancement layer stage 208(i). Thus, the $HQRB_i$ for enhancement layer 210(i) is $b_i \times F$, where F denotes the frame rate.

After the base layer bitstream 206 and the enhancement layer bitstreams 210(i) are generated by the video encoder 200, a selection module, such as the enhancement layer selection module 124 (FIG. 1), selects one of the enhancement layer bitstreams 210 for transmission over the network. Selection of an enhancement layer bitstream 210(i) is discussed below in more detail with regard to FIG. 3.

With regard to the base layer encoder 202, video data is input frame-by-frame to a motion estimator (ME) 212 to estimate the movement of objects from locations in the one video frame to other locations in subsequent video frames. The ME 212 also receives as reference for the current input, a base layer reference image 219 stored in frame buffer 0 (214(0)) as well as one or more high-quality reference images from the enhancement layers. The high-quality reference image has a different signal-to-noise ratio (SNR) resolution than the based layer reference 219.

As illustrated in FIG. 2, the ME 212 uses the high-quality reference image 218 from the frame buffer 214(n) at enhancement layer stage 208(n) and the base layer reference image 219. By using both the base layer reference image 219 and the high quality reference image 218 for comparison with the input video to determine motion vector(s), a good trade-off can be obtained between the base layer 206 performance and the performance of the enhancement layers 210(i). By using both the enhancement layer 210(n) reference and the base layer 206 reference in motion estimation, a significant gain can be achieved at a relatively high network bandwidth bit-rate while maintaining almost the same performance at a low network bandwidth bit-rate.

The ME 212 produces motion vectors that are sent to a motion compensator (MC) 216(0). In a PFGS encoding scheme, both the base layer bitstream 206 and the enhancement layer bitstreams 210(i) share the same set of motion vectors. The output of the MC 216(0) is "RefB" signal, which represents the base layer prediction. The RefB signal is input to loops in the enhancement layer encoder 204. The RefB signal is the result of applying motion displacement to a base layer reference 219. The ME 212 and MC 214(0), MC 214(1), up to MC 214(n) are well-known components used in conventional MPEG encoding.

An intra prediction generator 220 generates an intraframe (I-frame) block prediction associated with input video data, where the prediction is generated from the available information of neighboring blocks in the current frame, instead of using the information from the previous frame.

In base layer coding performed by the base layer encoder 202, a frame difference between the current input and the base layer prediction RefB signal is divided into 8×8 blocks. Each residual block is transformed by a DCT (Discrete Cosine Transform) module 222(0) and then quantized by a quantization (Q) module 224. The base layer bitstream 206 is generated by coding the quantized DCT coefficients using a variable length coder (VLC) 226(0). The output of the VLC 226(0) is the base layer bitstream 206, which is transmitted to the decoder.

The base layers of the frames are also passed through an anti-quantization ($Q^{-1}$) module 228. The de-quantized DCT coefficients are passed through inverse DCT (IDCT) module 230(0). The output of the IDCT module 230(0) is added to RefB in the base layer encoder 202. The output of the IDCT module 230(0), i.e. the coded residues at the base layer in the current frame, is also fed into the enhancement layer encoder 204, which is added to the temporal prediction of enhancement layers 210(1), 210(2), up to 210(n).

The sum of output of the IDCT module 230(0) and the RefB signal is filtered by loop filter 232(0). In one implementation, the loop filters 232 filter the input signal according to the H.264 standard. The output of the loop filter 232(0) is fed into the frame buffer 214(0). Thus, the frame buffer 214(0) represents the decoded base layer bitstream 206 of the previous frame.

With regard to the enhancement layer encoder 204, the enhancement layers are each independent from the other enhancement layers, and each enhancement layer bitstream is generated using outputs from the base layer encoder 202.

Turning to the enhancement layer stages 208(1), 208(2), ..., 208(n), four signals are input to each of the stages 208(1), 208(2), ..., 208(n): the coded residues obtained from the IDCT module 230(0) in the base layer encoder 202, the motion vectors from the motion estimator 212 in the base layer encoder 202, and the RefB signal from the base layer encoder 202.

The enhancement layer encoder 204 receives the video data, the motion vectors from the motion estimator 212, RefB from the motion compensator 216(0), and the coded residues from IDCT module 230(0) and produces enhancement layer bitstreams 210(1), 210(2), and so on, up to 210(n). At each stage 208(1), 208(2), ..., 208(n) of the enhancement layer encoder 204, a motion compensator (MC) 216(0), 216(2), ..., 216(n) receives the motion vectors (MVs) from the base layer encoder 202. Each MC 216(0), 216(2), ..., 216(n) also receives the output of a frame buffer 214(0), 214(2), ..., 214(n) that stores the decoded enhancement layer data from the previous frame. The MCs 216(0), 216(2), ..., 216(n) output motion compensated data for the enhancement layer for the current frame. Either the output from one of the MCs 216(1), 216(2), ..., 216(n) at each stage 208, or RefB from the motion compensator 216(0) is added to the coded residues from the IDCT module 230(0) from the base layer encoder 202, to form the enhancement layer prediction.

The video data is subtracted from the enhancement layer prediction at each enhancement layer stage. The result of the subtractions are respective displaced frame difference (DFD) signals of the corresponding stage. The DFD signals in stages 208(1), 208(2), ..., 208(n) are input into DCT modules 222(1), 222(2), ..., 222(n), respectively. The DCT modules 222(1), 222(2), ..., 222(n) generate DCT coefficients.

The outputs of the DCT modules 222(1), 222(2), ..., 222(n) are input into bit plane modules 234(1), 234(2), ..., 234(n), respectively. The bit plane modules 234(1), 234(2), ..., 234(n), represent each of the DCT coefficients as a binary number of several bits, which are arranged in a zigzag order into a one-dimensional array, referred to as a bit plane. The bit planes are stored in memory. Here, there are n bit plane modules 234(1), 234(2), ..., 234(n), that encode n enhancement layers that are subsequently coded by variable length coders (VLC) 226(1), 226(2), ..., 226(n), respectively. The output of each VLC 226(1), 226(2), ..., 226(n) is an enhancement layer bitstream 210(1), 210(2), ..., 210(n) for the respective stage 208(1), 208(2), ..., 208(n).

To track the enhancement layers, the output bit planes from the bit plane modules 234(1), 234(2), ..., 234(n) are input into IDCT modules 230(1), 230(2), ..., 230(n), respectively. The IDCT modules 230(1), 230(2), ..., 230(n) output decompressed representations of the enhancement layers. The decompressed enhancement layers from the IDCT modules 230(1), 230(2), ..., 230(n) are summed with the enhancement layer prediction, and then filtered by loop filters 232(1), 232(2), ..., 232(n). Frame buffers 214(1), 214(2), ..., 214(n) receive and store the respective decompressed, filtered enhancement layer data. The contents of the frame buffers 214(1), 214(2), ..., 214(n) are fed back to the motion compensators 216(1), 216(2), ..., 216(n), respectively.

With regard to the exemplary encoder 200 shown in FIG. 2, as illustrated, only one enhancement layer's high quality reference, namely the high quality reference 218 from enhancement layer stage 208(n) (the highest bit-rate enhancement layer), is used to determine the motion vectors from the motion estimator 212. In this particular implementation, other enhancement layers are not involved in the motion estimation procedure. By using only one high quality reference in this way, encoder complexity can be reduced.

Other implementations of the encoder 200 can use more than one high quality reference from other enhancement layer stages for the motion estimation procedure to meet design and/or performance criteria specific to a particular implementation. In such implementations, motion estimation may use one or more of the high quality references obtained from one or more of the frame buffers 214(1), 214(2), ..., 214(n).

As shown in FIG. 2, the number of bits used for the high quality reference associated with each enhancement layer stage 208(i) is shown by $b_i$. In this particular implementation of the encoder 200, the number of bits, $b_i$, is successively higher for each higher numbered enhancement layer stage 208(i). That is, $b_1 < b_2 < \ldots < b_n$. This implies that the bit-rates, $HQRB_i$, associated with each of the high quality reference images are $HQRB_1 < HQRB_2 < \ldots < HQRB_n$. Accordingly, for bitstream i ($1 \leq i \leq n$), the encoder only needs to generate bits from bit-rate 0 to bit-rate $HQRB_n$, i.e. for each frame, from 0 bits to $b_n$ bits. Such a method can significantly reduce operations for bit-plane scanning and variable length coding. This means that for enhancement layer bitstream 210(i), bits beyond $HQRB_i$ are useless and do not need to be generated by enhancement layer stage 208(i) to reconstruct the enhancement layer reference; however bits beyond $HQRB_i$ can improve quality at the decoder if they are transmitted. Using the encoder shown in FIG. 2, multiple enhancement layer bitstreams can be generated simultaneously in a low complexity encoder.

Figure 3:
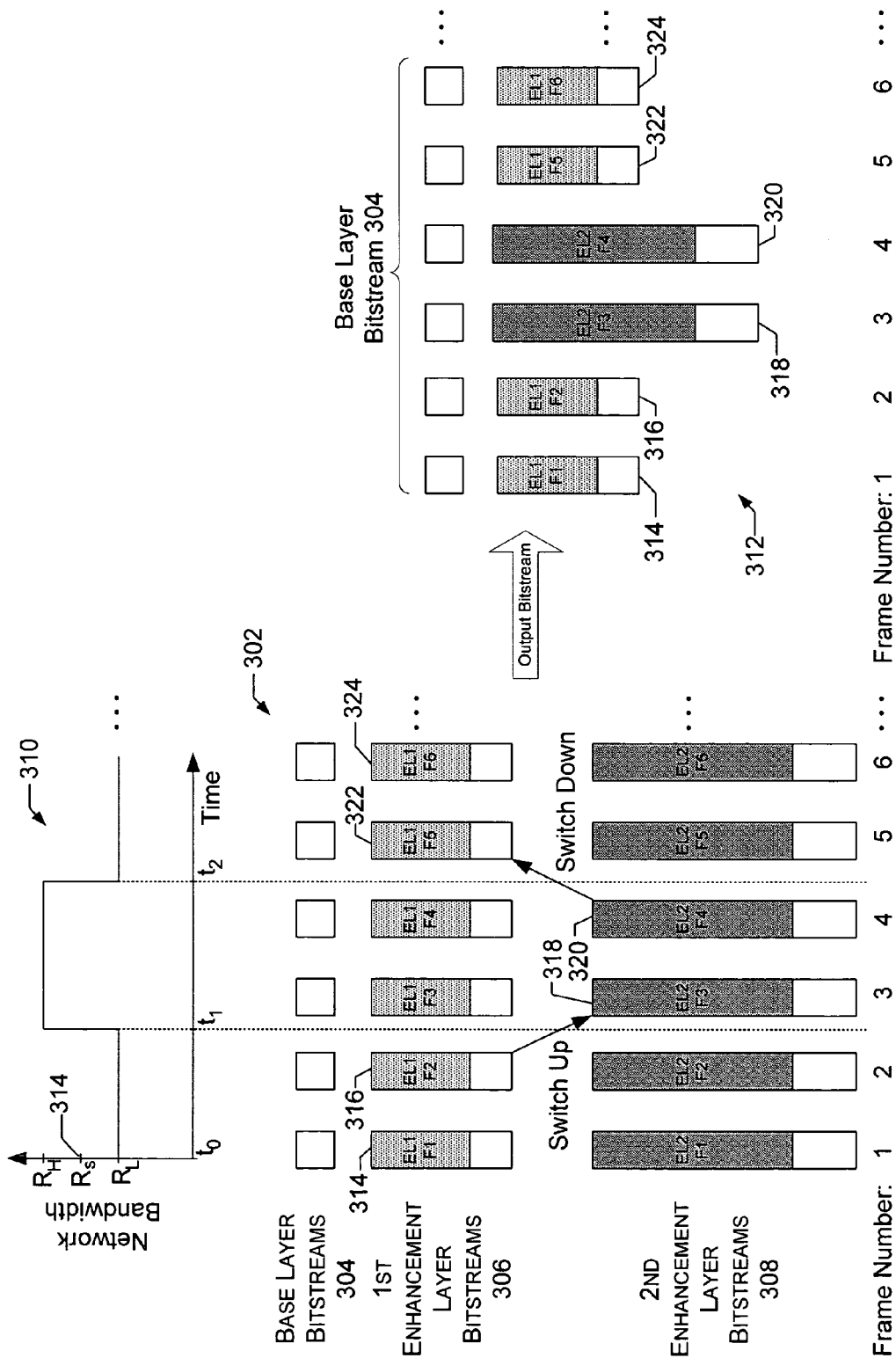
FIG. 3 is a diagrammatic illustration of an enhancement layer switching scheme without an associated difference bitstream, wherein switching is based on changes in available network bandwidth.

FIG. 3 illustrates an exemplary bitstream switching process, in which two enhancement layer bitstreams are generated, but only one enhancement layer bitstream is transmitted based on available network bandwidth and the $HQRB_i$ associated with the enhancement layer bitstreams. The bitstream switching process depicted in FIG. 3 can be performed by an enhancement layer selection module in conjunction with a base layer encoder and an enhancement layer encoder.

A group of Progressive Fine-Granularity Scalable (PFGS) bitstreams 302 is produced including base layer bitstreams 304, first enhancement layer bitstreams 306, and second enhancement layer bitstreams 308. The bitstreams are generated frame by frame as video data is received. In each frame, all of the bitstreams in the group 302 are concurrently generated. For clarity, each enhancement layer bitstream of each frame is labeled according to frame number and enhancement layer number. Thus, for example, the first enhancement layer bitstream 314 in frame 1 is labeled EL1F1, the first enhancement layer bitstream 316 in frame 2 is labeled EL1F2, and so on. Although FIG. 3 shows bitstreams corresponding to only two enhancement layers, it is to be understood that bitstreams for more than two enhancement layers may be generated and the enhancement layer selection module 124 may switch among any number of enhancement layers that are generated.

The base layer bitstreams 304 are composed of a continuous series of bits representing encoded input video data. The base layer bitstreams 304 represent the video at a relatively low resolution that is minimally acceptable for viewing. The base layer bitstreams 304 are encoded at a base bit-rate, denoted as $R_B$. Bit-rate refers to the number of bits used to represent a layer of a video frame. Bit-rate is related to the amount of compression and quantization applied to the video data at each layer. As an image is compressed more and/or quantized less, bit-rate is reduced.

The first enhancement layer bitstreams 306 and the second enhancement layer bitstreams 308 are encoded to achieve successively higher bit-rates in corresponding reference image. As discussed above, the bit-rate of a reconstructed reference image associated with an enhancement layer is referred to as High Quality Reference Bit Rates (HQRBs). The term $HQRB_i$ means that the ith that $b_i$ bits in the ith enhancement layer bitstream are used to reconstruct a high quality reference video frame. The first enhancement layer bitstreams 306 are encoded with $b_1$ bits to achieve a reference image bit-rate of $HQRB_1$ and the second enhancement layer bitstreams 308 are encoded with $b_2$ bits to achieve bit-rate $HQRB_2$. The successively larger shaded rectangular areas in FIG. 3 are used to illustrate that $b_2$ is greater than $b_1$.

Thus, the first enhancement layer bitstreams 306 and the second enhancement layer bitstreams 308 satisfy $HQRB_1 < HQRB_2$. At a network bandwidth bit-rate of $R_B + HQRB_2$, the second enhancement layer bitstream 308 will generally outperform the first enhancement layer bitstream 306, since the second enhancement layer bitstream 308 has higher quality references. In addition, drifting error that might have occurred in traditional codecs due to such scaling will be reduced or avoided entirely due to a method, described below, for choosing at what bit-rate to switch from the first enhancement layer bitstream 306 to the second enhancement layer bitstream 308.

Video data transmission performance can be improved by switching between enhancement layer bitstreams of different HQRB. With regard to the first enhancement layer bitstream 306 and the second enhancement layer bitstream 308, the first enhancement layer bitstream 306 will typically outperform the second enhancement layer bitstream 308 at comparatively low network bandwidth because $HQRB_1$ is better matched to the low bit-rates; however, at comparatively higher network bandwidth, the second enhancement layer bitstream 308 typically performs better because $HQRB_2$ is better matched to the higher bit-rates.

Accordingly, when the network bandwidth exceeds a particular bit-rate (called the switching bit-rate), the video encoding and transmission procedure will switch from the first enhancement layer bitstream 306 to the second enhancement layer bitstream 308. Switching from a lower HQRB bitstream to a higher HQRB bitstream (e.g., from $HQRB_1$ to $HQRB_2$) is referred to as switching up. Switching from a higher HQRB bitstream to a lower HQRB bitstream (e.g., from $HQRB_2$ to $HQRB_1$) is referred to as switching down. The bitstream can be switched at each frame.

With regard to the exemplary situation illustrated in FIG. 3, an enhancement layer selection module dynamically switches between the first enhancement layer bitstream 310 and the second enhancement layer bitstream 312 according to changes in available network bandwidth. A bandwidth graph 310 illustrates how available network bandwidth may change over time. At time $t_0$, available bandwidth starts at a low bandwidth, $R_L$. At time $t_1$, the available bandwidth increases to a high bandwidth, $R_H$. Later at time $t_2$, the available bandwidth decreases back to the low bandwidth, $R_L$. A switching bandwidth, $R_S$, exists between the low bandwidth $R_L$ and the high bandwidth $R_H$.

As time progresses, the base layer bitstream 304, the first enhancement layer bitstream 306, and the second enhancement layer bitstream 308 are concurrently generated at each frame as shown. Output bitstreams 312 are generated frame by frame as the base layer bitstreams 304, the first enhancement layer bitstreams 306, and the second enhancement layer bitstreams 308 are generated. The base layer bitstream 304 is continuously transmitted, but only one of the enhancement layer bitstreams is included in the output bitstream 312 in any frame. At time $t_0$, when the available bandwidth is $R_L$, the first enhancement layer bitstream for frame 1 (EL1F1) 314 is selected. During frame 2, the bandwidth is still $R_L$, so the first enhancement layer bitstream (EL1F2) 316 is selected.

When the bandwidth increases to $R_H$ at time $t_2$, the enhancement layer selection module 124 detects a bandwidth transition through the switching bandwidth, $R_S$. In response, a higher HQRB layer is switched to. Thus, at frame 3, the enhancement layer 2 (EL2F3) 318 is selected and transmitted in the output bitstream 312. At frame 4, the bandwidth remains above $R_S$ at $R_H$, so the enhancement layer bitstream (EL2F4) 320 is selected.

When the bandwidth decreases to $R_H$ at time $t_2$, the enhancement layer selection module 124 detects a bandwidth transition through the switching bandwidth, $R_S$ and inserts the first enhancement layer bitstream (EL1F6) 322 into the output bitstream 312. Thus, at each frame an enhancement layer bitstream is selected and transmitted depending on the available network bandwidth and the HQRBs of the first enhancement layer bitstreams 306 and the second enhancement layer bitstreams 308.

The switching bit-rate may be determined for the first enhancement layer bitstream 306 and the second enhancement layer bitstream 308 as follows. Because $HQRB_1$ is less than $HQRB_2$, better performance is achieved by transmitting the first enhancement layer bitstream 306 when the available network bandwidth is in the range $[0, HQRB_1]$. Similarly, when the available network bandwidth is equal to or greater than $HQRB_2$, better performance is achieved by transmitting the second enhancement layer bitstream 308 because there is less drifting error and the second enhancement layer bitstream 308 serves as a better reference.

When the network bandwidth is between ($HQRB_1$, $HQRB_2$), it is not easy to tell which of the bitstreams should be transmitted. A rate-distortion based method can be advantageously applied to estimate the switching bit-rate, $R_S$, which gives a clear segmentation, wherein below $R_S$, the first enhancement layer bitstream 306 is chosen and beyond $R_S$, the first enhancement layer bitstream 308 is switched to. The estimation problem can be solved by estimating each bitstream's distortion at a certain bit-rate. Suppose that an n-frame sequence is coded. For each frame, since the image decoded is the sum of prediction image and residue signals, the distortion of this frame consists of two sources. One source is the distortion of the residue signals, and the other source is the distortion of the prediction image, which caused by drifting error. For the entire sequence, the distortion includes these two sources too, which can be characterized by the following equation:

$$D(R) = D_{res}(R) + D_{drifting}(R) \qquad (1)$$

where $D_{res}(R)$ and $D_{drifting}(R)$ denote the distortion of residue images and drifting error respectively. $D_{res}(R)$ can be determined in a PFGS encoder, such as the encoder 118, because the residue images are coded bit-plane by bit-plane.

In addition, if it is assumed that drifting error caused by each frame is independent, $D_{drifting}(R)$ can be estimated as:

$$D_{drifting}(R) = \sum_{i=1}^{n} D_{drifting}^{i}(R) \quad (2)$$

$D_{drifting}^{i}(R)$ is the drifting error caused by the frame i, $1 \leq i \leq n$. $D_{drifting}^{i}(R)$ is caused by the current frame's mismatch between the reference images of the encoder and the decoder. And this mismatch, denoted as $Diff^i(R)$ can be calculated by comparing the encoder's reference image and the decoder's reference at R that is also available in the encoder. Thus, if network bandwidth, R is greater than or equal to HQRB, $Diff^i(R)$ will be 0, as will $D_{drifting}^{i}(R)$. Note that not all macro-blocks suffer drifting error of the enhancement layer. For those macro-blocks referenced from the base layer, they are not affected by $Diff^i(R)$. Let $c_j$ be the percentage of the macro-blocks of the frame j that use the high quality reference. Then the intensity of influence of $Diff^i(R)$ on the frame j can be estimated as $$Diff^i(R) \prod_{k=i+1}^{j} C_k,$$

so $D_{drifting}^{i}(R)$ is estimated by:

$$D_{drifting}^{i}(R) = \sum_{j=i+1}^{n} \left( Diff^i(R) \prod_{k=i+1}^{j} C_k \right) \quad (3)$$

Equations (2) and (3) can be used to derive equation (4):

$$D_{drifting}(R) = \sum_{i=1}^{n} D_{drifting}^{i}(R) = \sum_{i=1}^{n} \sum_{j=i+1}^{n} \left( Diff^i(R) \prod_{k=i+1}^{j} C_k \right) \quad (4)$$

Accordingly, by summing $D_{res}(R)$ and $D_{drifting}(R)$, $D(R)$ can be estimated at a given bit-rate R.

For any 2 enhancement layer bitstreams, the switching bit-rate $R_S$ is the bit-rate at which the first enhancement layer bitstream 306 and the second enhancement layer bitstream 308 have the same D(R) value, denoted as $$D_1(R_S) = D_2(R_S) \quad (5)$$

If $R < R_S$, then $D_1(R) < D_2(R)$. Conversely, when $R > R_S$, $D_1(R) > D_2(R)$. As mentioned above, $R_S$ should be within (HQRB$_1$, HQRB$_2$). Equation (5) can be solved by a bisection method wherein the initial interval is (HQRB$_1$, HQRB$_2$). As known in the art, the bisection method proceeds by evaluating the function in question at the midpoint of the original interval (HQRB$_1$+HQRB$_2$)/2 and testing to see in which of the subintervals [HQRB$_1$, (HQRB$_1$+ HQRB$_2$)/2] or [(HQRB$_1$+HQRB$_2$)/2, HQRB$_2$] the solution lies. The estimation method can be extended to implementations that employ multiple enhancement layer bitstreams, in which a switching bit-rate is estimated for each pair of enhancement layer bitstreams.

An enhancement layer switching strategy can be implemented based on the above equations and results. An enhancement layer switching strategy refers to the policy of switching from one enhancement layer to another; i.e., under what conditions the decision is made to switch enhancement layers. An exemplary strategy is based on the available network bandwidth or bit-rate. As mentioned above, an estimate can be made as to which bitstream will work better given the bitstream's bit-rate and the available network bandwidth. The estimate can be improved by considering drifting that may be caused by switching.

If switching occurs, the high quality reference changes, and the decoder does not have previous frames of the bitstream switched to, there may be a reference mismatch. Thus, drifting error emerges. When bandwidth fluctuation is high, drifting error can be exacerbated by frequent enhancement layer switching. Performance under such conditions may be improved by making the encoder less sensitive to fluctuations in network bandwidth. To improve the estimate of the switching bit-rate, $R_S$, a buffer bit-rate, $R_{Buf}$, can be added to the original estimate of $R_S$. The buffer bit-rate, $R_{Buf}$, can improve performance by reducing the number of frequent enhancement layer switches. Mathematically, a new switching bit-rate, $R'_S$, can be expressed as follows:

$$R'_S > R_S + R_{Buf} \quad (6)$$

Figure 4:
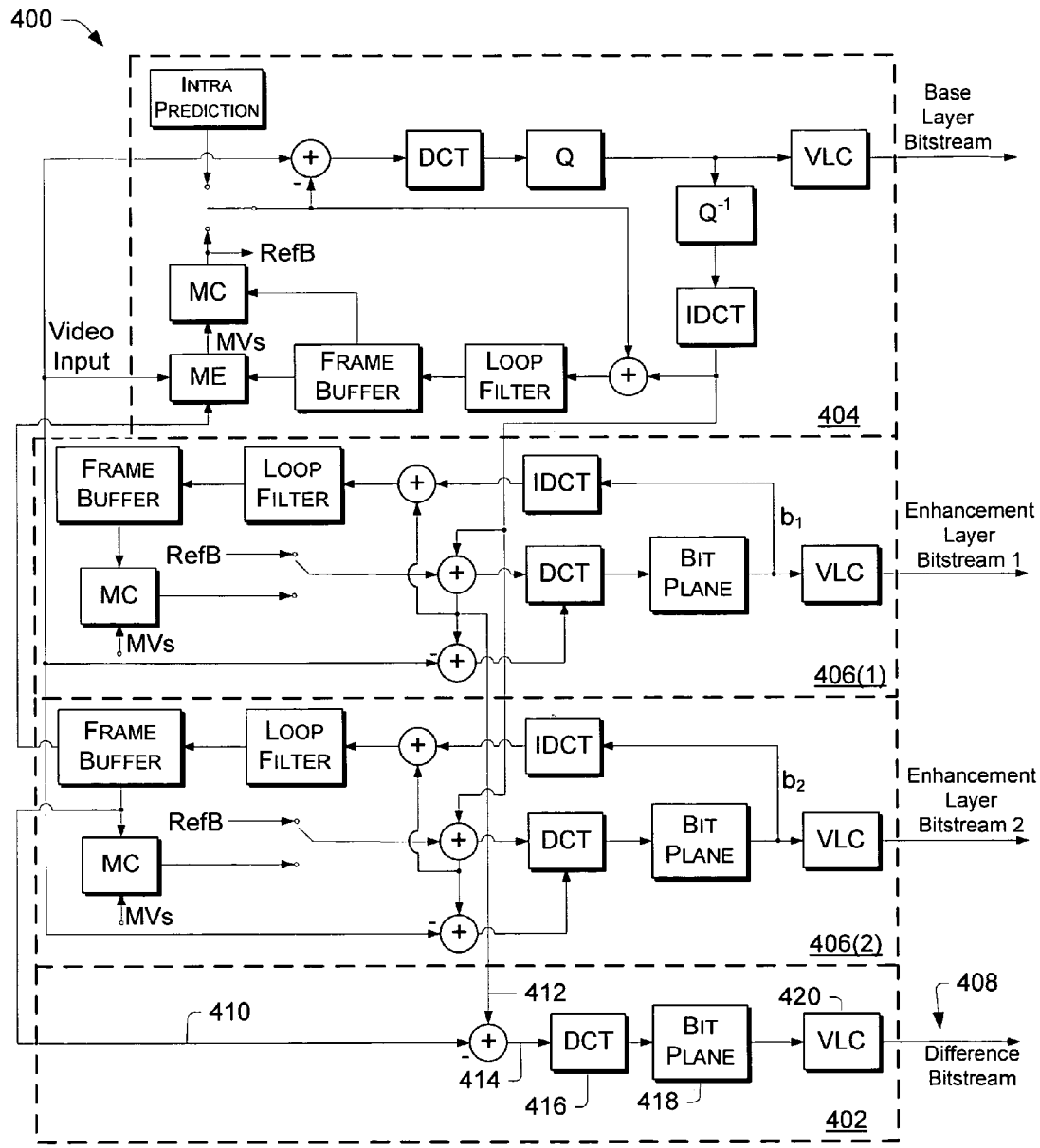
FIG. 4 is a block diagram of another exemplary video encoder implemented at the content producer/provider and including a difference bitstream encoder for reducing possible drifting errors caused by stream switching.

FIG. 4 is a block diagram of another exemplary video encoder 400 implemented at a content producer/provider and including a difference bitstream encoder 402. As with the encoder 200 shown in FIG. 2, the video encoder 400 of FIG. 4 includes a base layer encoder 404, a first enhancement layer stage 406(1), and second enhancement layer stage 406(2). The base layer encoder 404, the first enhancement layer encoder 406(1), and second enhancement layer encoder 406(2), carry out operations analogous to the base layer encoder 202, the first enhancement layer stage 208(1), and the second enhancement layer stage 208(2), respectively, which are shown and describe above with respect to FIG. 2. Therefore, the base layer encoder 404, the first enhancement layer encoder 406(1), and the second enhancement layer encoder 406(2) are not discussed in detail here.

The main relevant difference between the video encoder 400 and the video encoder 200 shown in FIG. 2, is the difference bitstream encoder 402. In general, the difference bitstream encoder 402 receives and combines data from the first enhancement layer stage 406(1) and data from the second enhancement layer stage 406(2), and encodes the combination of the data to form a difference bitstream 408. The difference bitstream represents a difference between a high quality reference image 410 from second enhancement layer stage 406(2) and the enhancement layer prediction from the first enhancement layer stage 406(1).

The high quality reference image 410 is subtracted from the enhancement layer prediction of the enhancement layer 412 from the first enhancement layer stage 406(1) to create a difference signal 414. The difference signal is transformed by a discrete cosine transform (DCT) function of DCT module 416. The DCT module 416 outputs DCT coefficients that are encoded into a bit plane by a bit plane module 418. The output of the bit plane module 416 is input to a variable length coder (VLC) 420, which variable length encodes the bit plane. The output of the VLC 420 is the enhancement layer difference bitstream 408.

Figure 5:
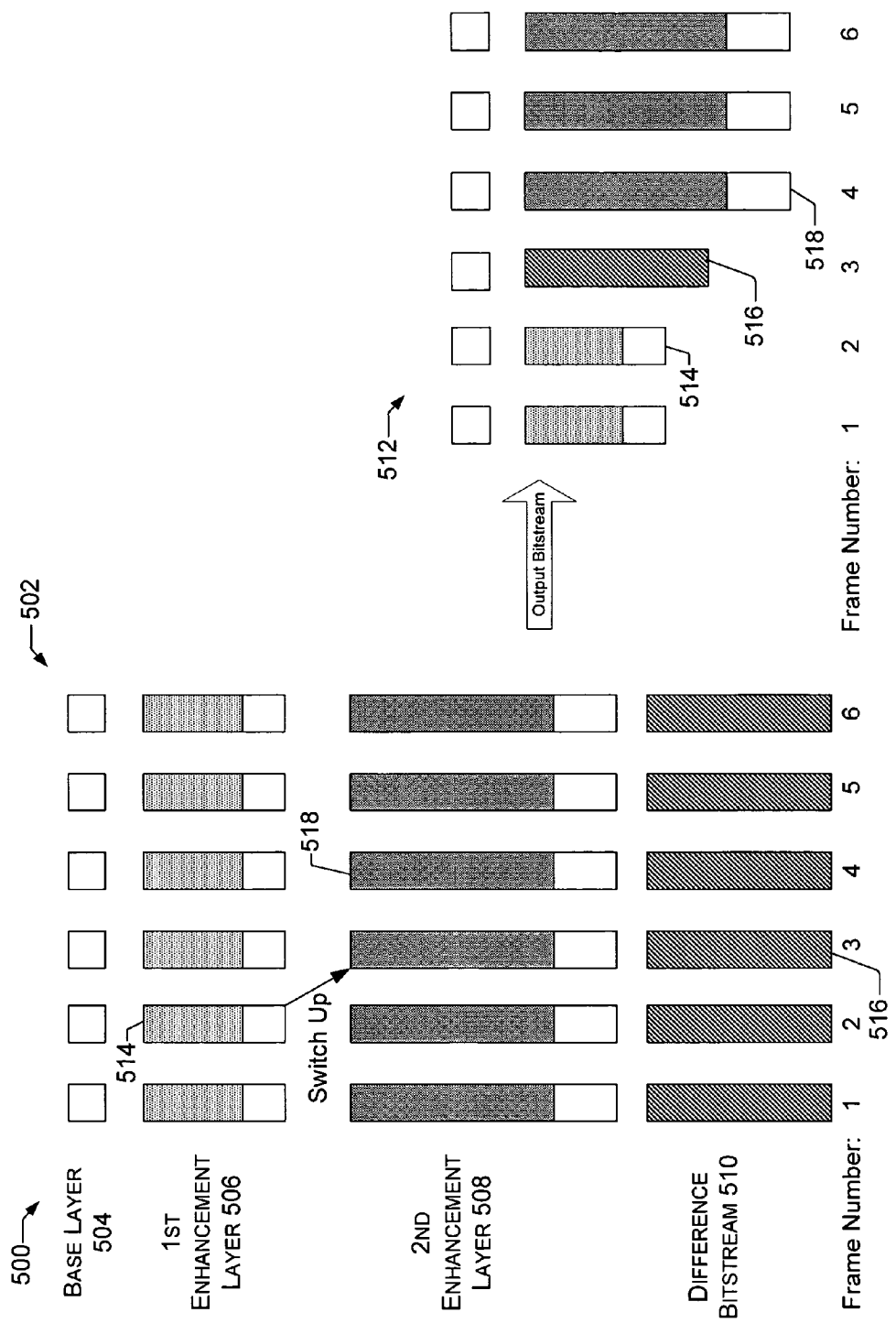
FIG. 5 is a diagrammatic illustration of an enhancement layer switching scheme with an associated difference bitstream, wherein switching is based on changes in available network bandwidth.

FIG. 5 is a diagrammatic illustration of an exemplary difference bitstream generation scheme 500 that may be employed in response to detection of network bandwidth. The difference bitstream generation scheme 500 can be realized using the video encoder 400 illustrated in FIG. 4. A group of PFGS video layer bitstreams 502 are generated frame-by-frame. The group 502 includes base layer bitstreams 504, first enhancement layer bitstreams 506, second enhancement layer bitstreams 508 and enhancement layer difference bitstreams 510.

Output bitstreams 512 are output by the video encoder frame-by-frame. In each frame, the output bitstream 512 includes a base layer bitstream from the base layer bitstream 504, and one of either the first enhancement layer bitstreams 506 and the second enhancement layer bitstreams 508, or the difference bitstream 510. In frames that the output bitstream 512 includes either the first enhancement layer bitstream 506 or the second enhancement layer bitstream 508, the transmitted enhancement layer bitstream is selected based on detected network bandwidth, in a manner as is discussed above with respect to FIG. 3.

Thus, the exemplary situation illustrated in FIG. 5 includes a switch up between frame 2 and frame 3. The exemplary situation assumes that the detected network bandwidth transitioned from a low network bandwidth to a high network bandwidth, and that the bandwidth transitioned through a switching bit-rate. Prior to the bandwidth transition, a selected first enhancement layer bitstream 514 is transmitted in the output bitstream 512.

After the bandwidth transition occurs, and in response to the bandwidth transition, a scalable difference bitstream 516 is transmitted in the output bitstream 512 in frame 3, in place of an enhancement layer bitstream. Thus, when the difference bitstream 516 is transmitted, the base layer bitstream 504 is transmitted but the enhancement layer bitstream is not. As discussed earlier, the difference bitstream 516 represents a difference between the first enhancement layer bitstream 514 and a second selected enhancement layer bitstream 518. In frame 4, the second selected enhancement layer bitstream 518 is transmitted.

Advantageously, the scalable difference bitstream 516 enables the transmitting computer to flexibly decide how many bits should be dedicated to the difference bitstream 516 when enhancement layer bitstream switching occurs. Drifting between the server computer and the client computer can be greatly reduced or eliminated if all the bits in the difference bitstream 516 are received by the client. Thus, the encoder may truncate the difference bitstream 516 prior to transmission (i.e., send fewer than all the difference bitstream bits). In addition, no extra frame's bits need to be sent and decoded. As illustrated in FIG. 5, in the bitstream switching process, including the difference bitstream 516 does not impact the number of frames decoded. The decoder can decode the difference bitstream 516 as a standard PFGS bitstream, which means that the bitstream switching process with drifting error compensated is transparent to the decoder.

Figure 6:
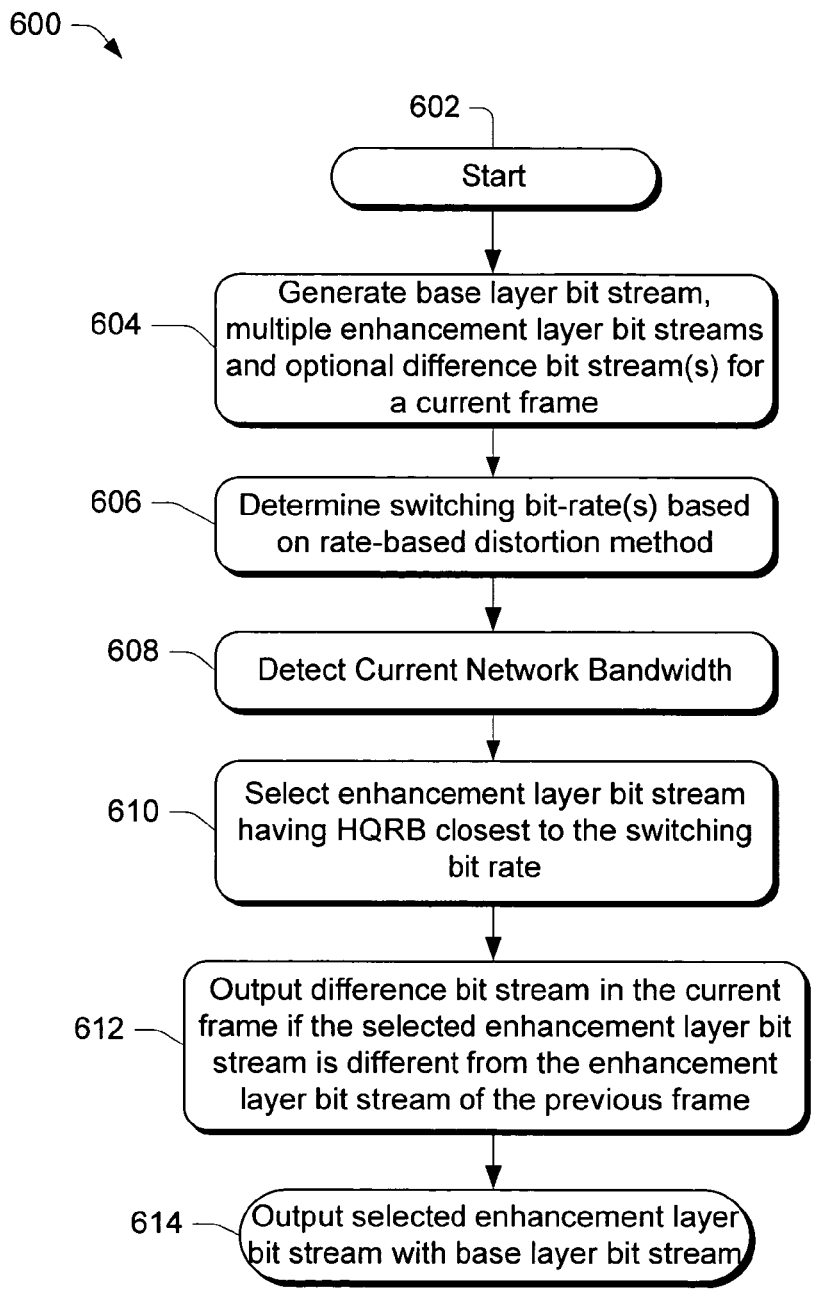
FIG. 6 is a flow diagram showing a method for determining one enhancement layer bitstream from a plurality of enhancement layer bitstreams based on network bandwidth.

FIG. 6 is a flow diagram showing an enhancement layer bitstream switching operation 600 for selecting one enhancement layer bitstream from a plurality of enhancement layer bitstreams based on network bandwidth. The operation 600 may further output a difference bitstream when a switch is made from one enhancement layer bitstream to another enhancement layer bitstream. The operation 600 can be performed by the encoder 118, described in FIG. 1.

After a starting operation 602, a generating operation 604 receives a frame of video data and generates a base layer bitstream, two or more enhancement layer bitstreams, and, optionally, one or more difference bitstreams. The generating operation 604 preferably, although not necessarily, generates the bitstreams concurrently as a video frame is input.

A determining operation 604 determines one or more switching bit-rates based on high quality reference bit rates (HQRBs) associated with enhancement layer bitstreams. For each pair of enhancement layer bitstreams generated in the generating operation 604, a switching bit-rate is determined between the two enhancement layer bitstreams in the pair. As discussed above, a rate-distortion based method can be employed to determine the one or more switching bit-rates. In the rate-distortion based method, a switching bit-rate may be determined between two HQRBs by using a bisection method discussed above.

A detecting operation 608 detects the current network band. Network bandwidth may be detected using methods known in the art, such as network probing and modeling. A selecting operation 610 selects one of the previously generated enhancement layer bitstreams based on the HQRBs of the enhancement layers, the one or more switching bit-rates, and the detected network bandwidth. In one implementation, the selecting operation 610 first identifies the switching bit-rate that is closest to the detected network bandwidth. Then the selecting operation 610 determines the HQRB of an enhancement layer that is closest to the switching bit-rate. The enhancement layer with an HQRB closest to the identified switching bit-rate is selected in the selecting operation 610.

An optional outputting operation 612 outputs a difference bitstream if the selected enhancement layer for the current frame is different from the selected enhancement layer of the previous frame. A second outputting operation 614 outputs the base layer bitstream and the selected enhancement layer bitstream.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method comprising:
   generating a base layer bitstream and a plurality of independent enhancement layer bitstreams of a first video frame, each bitstream encoded from the first video frame and an associated high-quality reference image from the independent enhancement layer bitstreams, the high quality reference image having an associated high quality reference bit-rate;
   determining a switching bit-rate associated with an available bandwidth of a network; and
   selecting a first independent enhancement layer bitstream from the plurality of independent enhancement layer bitstreams of the first video frame based on the switching bit-rate.

2. A method as recited in claim 1 wherein the generating operation comprises concurrently generating the plurality of independent enhancement layer bitstreams.

3. A method as recited in claim 1 further comprising:
   generating a plurality of independent enhancement layer bitstreams of a second video frame, each bitstream being generated from the second video frame using the associated high quality reference bit-rates;
   selecting a second independent enhancement layer bitstream from the plurality of independent enhancement layer bitstreams of the second video frame; and
   generating a difference bitstream representing a difference between the first selected independent enhancement layer bitstream and the second selected independent enhancement layer bitstream.

4. A method as recited in claim 1 wherein the determining operation comprises estimating a switching bit-rate associated with two of the plurality of independent enhancement layer bitstreams, such that distortion values associated with transmission of the two enhancement layer bitstreams are substantially equal.

5. A method as recited in claim 1 wherein the determining operation comprises:
   estimating a switching bit-rate between a pair of the high quality reference bit-rates of two of the plurality of independent enhancement layer bitstreams, the estimated switching bit-rate based on distortion values associated with transmission of the two enhancement layer bitstreams; and
   adding a buffer bit-rate to the estimated switching bit-rate, the buffer bit-rate corresponding to a level of fluctuation of the network bandwidth.

6. A method as recited in claim 1 wherein the high quality reference bit-rates associated with the enhancement layer bitstreams are successively higher.

7. A method as recited in claim 1 wherein the determining operation comprises computing a switching bit-rate as a function of at least two high quality reference bit-rates associated with two adjacent enhancement layer bitstreams in the plurality of enhancement layer bitstreams.

8. A method as recited in claim 7 wherein the computing operation comprises computing an average bit-rate between the at least two high quality reference bit-rates.

9. A method as recited in claim 1 further comprising encoding the base layer bitstream and the plurality of enhancement layer bitstreams according to an H.26L or H.264 video standard.

10. A method as recited in claim 1 further comprising transmitting the base layer bitstream and the first independent enhancement layer bitstreams.

11. A method as recited in claim 1 further comprising:
   receiving the base layer bitstream and the first independent enhancement layer bitstream; and
   decoding the base layer bitstream and the first independent enhancement layer bitstream to display the first video frame on a display device.

12. A method as recited in claim 1 wherein the generating operation further comprises:
   generating the base layer bitstream by applying motion estimation to the first video frame and a plurality of high-quality reference images having associated high quality reference bit-rates.

13. A system comprising:
   means for generating a base layer bitstream and a plurality of independent enhancement layer bitstreams of a first video frame, each bitstream encoded from the first video frame and an associated high-quality reference image from the independent enhancement layer bitstreams, the high quality reference image having an associated high quality reference bit-rate;
   means for determining a switching bit-rate associated with an available bandwidth of a network; and
   means for selecting a first independent enhancement layer bitstream from the plurality of independent enhancement layer bitstreams of the first video frame based on the switching bit-rate.

14. A system as recited in claim 13 wherein the generating operation comprises concurrently generating the plurality of independent enhancement layer bitstreams.

15. A system as recited in claim 13 further comprising:
   means for generating a plurality of independent enhancement layer bitstreams of a second video frame, each bitstream being generated from the second video frame using the associated high quality reference bit-rates;
   means for selecting a second independent enhancement layer bitstream from the plurality of independent enhancement layer bitstreams of the second video frame; and
   means for generating a difference bitstream representing a difference between the first selected independent enhancement layer bitstream and the second selected independent enhancement layer bitstream.

16. A system as recited in claim 13 wherein the determining operation comprises estimating a switching bit-rate associated with two of the plurality of independent enhancement layer bitstreams, such that distortion values associated with transmission of the two enhancement layer bitstreams are substantially equal.

17. A system as recited in claim 13 wherein the determining operation comprises:
   estimating a switching bit-rate between a pair of the high quality reference bit-rates of two of the plurality of independent enhancement layer bitstreams, the estimated switching bit-rate based on distortion values associated with transmission of the two enhancement layer bitstreams; and
   adding a buffer bit-rate to the estimated switching bit-rate, the buffer bit-rate corresponding to a level of fluctuation of the network bandwidth.

18. A system as recited in claim 13 wherein the high quality reference bit-rates associated with the enhancement layer bitstreams are successively higher.

19. A system as recited in claim 13 wherein the determining operation comprises computing a switching bit-rate as a function of at least two high quality reference bit-rates associated with two adjacent enhancement layer bitstreams in the plurality of enhancement layer bitstreams.

20. A system as recited in claim 19 wherein the computing operation comprises computing an average bit-rate between the at least two high quality reference bit-rates.

21. A system as recited in claim 13 further comprising transmitting the base layer bitstream and the first independent enhancement layer bitstreams.

22. A system as recited in claim 13 further comprising:
   means for receiving the base layer bitstream and the first independent enhancement layer bitstream; and
   means for decoding the base layer bitstream and the first independent enhancement layer bitstream to display the first video frame on a display device.

23. A system as recited in claim 13 wherein the generating operation further comprises: generating the base layer bitstream by applying motion estimation to the first video frame and a plurality of high-quality reference images having associated high quality reference bit-rates.

24. A computer-readable medium having stored thereon computer-executable instruction for performing a method comprising:
   generating a base layer bitstream and a plurality of independent enhancement layer bitstreams of a first video frame, each bitstream encoded from the first video frame and an associated high-quality reference image from the independent enhancement layer bitstreams, the high quality reference image having an associated high quality reference bit-rate;
   determining a switching bit-rate associated with an available bandwidth of a network; and selecting a first independent enhancement layer bitstream from the plurality of independent enhancement layer bitstreams of the first video frame based on the switching bit-rate.

25. A computer-readable medium as recited in claim 24 wherein the generating operation comprises concurrently generating the plurality of independent enhancement layer bitstreams.

26. A computer-readable medium as recited in claim 24, the method further comprising:
generating a plurality of independent enhancement layer bitstreams of a second video frame, each bitstream being generated from the second video frame using the associated high quality reference bit-rates;
selecting a second independent enhancement layer bitstream from the plurality of independent enhancement layer bitstreams of the second video frame; and
generating a difference bitstream representing a difference between the first selected independent enhancement layer bitstream and the second selected independent enhancement layer bitstream.

27. A computer-readable medium as recited in claim 24 wherein the determining operation comprises estimating a switching bit-rate associated with two of the plurality of independent enhancement layer bitstreams, such that distortion values associated with transmission of the two enhancement layer bitstreams are substantially equal.

28. A computer-readable medium as recited in claim 24 wherein the determining operation comprises:
estimating a switching bit-rate between a pair of the high quality reference bit-rates of two of the plurality of independent enhancement layer bitstreams, the estimated switching bit-rate based on distortion values associated with transmission of the two enhancement layer bitstreams; and
adding a buffer bit-rate to the estimated switching bit-rate, the buffer bit-rate corresponding to a level of fluctuation of the network bandwidth.

29. A computer-readable medium as recited in claim 24 wherein the high quality reference bit-rates associated with the enhancement layer bitstreams are successively higher.

30. A computer-readable medium as recited in claim 24 wherein the determining operation comprises computing a switching bit-rate as a function of at least two high quality reference bit-rates associated with two adjacent enhancement layer bitstreams in the plurality of enhancement layer bitstreams.

31. A computer-readable medium as recited in claim 30 wherein the computing operation comprises computing an average bit-rate between the at least two high quality reference bit-rates.

32. A computer-readable medium as recited in claim 25, the method further comprising transmitting the base layer bitstream and the first independent enhancement layer bitstreams.

33. A computer-readable medium as recited in claim 25, the method further comprising:
receiving the base layer bitstream and the first independent enhancement layer bitstream; and
decoding the base layer bitstream and the first independent enhancement layer bitstream to display the first video frame on a display device.

34. A computer-readable medium as recited in claim 25 wherein the generating operation further comprises: generating the base layer bitstream by applying motion estimation to the first video frame and a plurality of high-quality reference images having associated high quality reference bit-rates.

* * * * *